(12) United States Patent
Li et al.

(10) Patent No.: US 7,369,544 B2
(45) Date of Patent: May 6, 2008

(54) INTERNET TELEPHONE SYSTEM WITH HUNTING DIVERSION

(75) Inventors: Xian-Xiang Li, San Jose, CA (US);
Runlin Dong, Fremont, CA (US)

(73) Assignee: Innomedia PTE Ltd, Singapore (SG)

( * ) Notice: Subject to any disclaimer, the term of this patent is extended or adjusted under 35 U.S.C. 154(b) by 1098 days.

(21) Appl. No.: 10/377,067

(22) Filed: Feb. 28, 2003

(65) Prior Publication Data

US 2004/0170160 A1 Sep. 2, 2004

(51) Int. Cl.
*H04L 12/66* (2006.01)
(52) U.S. Cl. .................. 370/353; 340/2.71; 379/93.07; 379/275
(58) Field of Classification Search ................ 370/270, 370/352, 359, 524, 353; 379/265.02, 265.01, 379/93.07, 273, 275; 340/2.71
See application file for complete search history.

(56) References Cited

U.S. PATENT DOCUMENTS 6,661,785 B1 * 12/2003 Zhang et al. ................ 370/352

6,816,589 B2 * 11/2004 Pinard .................... 379/265.01

\* cited by examiner

*Primary Examiner*—Gerald Gauthier
(74) *Attorney, Agent, or Firm*—Timothy P. OHagan (57) ABSTRACT

A method of diverting a hunting function of a PSTN central office switch is provided. The method diverts a hunting function in the event a channel within a hunting group is available but a call can not be completed. The method comprises detecting a status of a plurality of user channels to determine whether all user channels associated with the hunting group are in use and providing a hunting diversion message to the PSTN central office switch in response to determining that all user channels associated with the hunting group are in use. The method also comprises detecting at least one user channel associated with the hunting group is available for an inbound call and providing a hunting enable message to the PSTN central office switch in response to determining that at least one user channel associated with the hunting group is available for an inbound call.

5 Claims, 6 Drawing Sheets

| Outbound Routing Table | | ~100 |
|---|---|---|
| Routing Criteria 104 | Route 102 | |
| Local Area Code | PSTN | |
| All County Code Except "1" | Call Agent | |
| Long Distance Codes | Call Agent | |

Figure 4

| PBX Resource Status Table 116 | | | | |
|---|---|---|---|---|
| PBX Media Channel | PBX 118 Channel State | FoS 120 | Channel ID 122 | Media 124 Bus Channel |
| 1 | Active | 1,2,3,4 | PSTN 1 | A |
| 2 | Active | 1,2,3,4 | VOIP A | B |
| 3 | Active | 1,2,3,4 | VOIP B | C |
| 4 | Inactive | 1,2,3,4 | — | — |
| 5 | Active | 5,6 | VOIP C | D |
| 6 | Active | 5,6 | VOIP D | E |

| PSTN Resource Status Table 142 | | | | |
|---|---|---|---|---|
| PSTN Media Channel | PSTN 144 Channel State | Hunt Group ID 146 | FiC 147 | Diversion Status 148 |
| 1 | Active | 1 | 1 | — |
| 2 | Inactive | 1 | 1 | — |
| 3 | Inactive | 1 | 1 | — |
| 4 | Inactive | 1 | 1 | — |
| 5 | Inactive | 2 | 0 | Divert |
| 6 | Inactive | 2 | 0 | Divert |

Extension Resource Status Table 160

| Extension ID | Extension State 162 | FoS 164 | Channel ID 166 | Media 168 Bus Channel |
|---|---|---|---|---|
| 1 | Active | 1,2,3,4 | PSTN 1 | A |
| 2 | Active | 1,2,3,4 | VOIP A | B |
| 3 | Active | 1,2,3,4 | VOIP B | C |
| 4 | Inactive | 1,2,3,4 | — | — |
| 5 | Active | 5,6 | VOIP C | D |
| 6 | Active | 5,6 | VOIP D | E |

INTERNET TELEPHONE SYSTEM WITH HUNTING DIVERSION

TECHNICAL FIELD

The present invention relates to an Internet telephony gateway which routes each outgoing telephone calls to one of the public switched telephone network and the Internet, and in particular to such an Internet telephony gateway that manages a hunting function of the public switched telephone network to avoid hunting failures.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each of the two endpoint telephones is coupled to a local switching station by a dedicated pair of copper wires known as a subscriber loop. The two switching stations are connected by a trunk line network which in the early systems comprised multiple copper wire pairs. When a telephone call is placed, the circuit is completed by dynamically coupling each subscriber loop to the trunk line network such that a circuit is completed between the two subscriber loops.

More recently both the trunk lines between central offices and the subscriber loops have been replaced with digital transmission systems. More specifically, multiple twisted pair trunk lines have been replaced a high bandwidth transmission medium such as fiber optics and a computing device on each end of the transmission medium utilizes a time division protocol to create multiple 64 kb communication channels coupled to the other computing device. Each 64 kb "point-to-point" communication channel is adequate for emulating a twisted pair circuit for audio communication.

Similarly, businesses that utilize a private branch exchange (PBX) system for their internal telephone network often utilize one or more ISDN lines for coupling to the central office rather than multiple twisted pair subscriber loops. The PBX system and the corresponding systems of the central office utilize a time division protocol to creating multiple 64 Kb "point-to-point" communication channels and a signaling channel.

Unlike the "point-to-point dedicated channel" structure of the PSTN, the Internet transmits frames of digital date between two endpoints utilizing a frame switched protocol. The Internet comprises multiple routers interconnected to each other by broadband transmission mediums. Each data frame includes complete addressing information that enables it to be transferred from its origin endpoint to its destination endpoint by the routers and independent of any other data frames that may be addressed from the same origin endpoint to the same destination endpoint.

Advances in packet switched communication technologies, audio compression technologies, and Internet network capacity have made it possible for telephone calls to be provided over the packet switched structure of the Internet.

Figure 1:
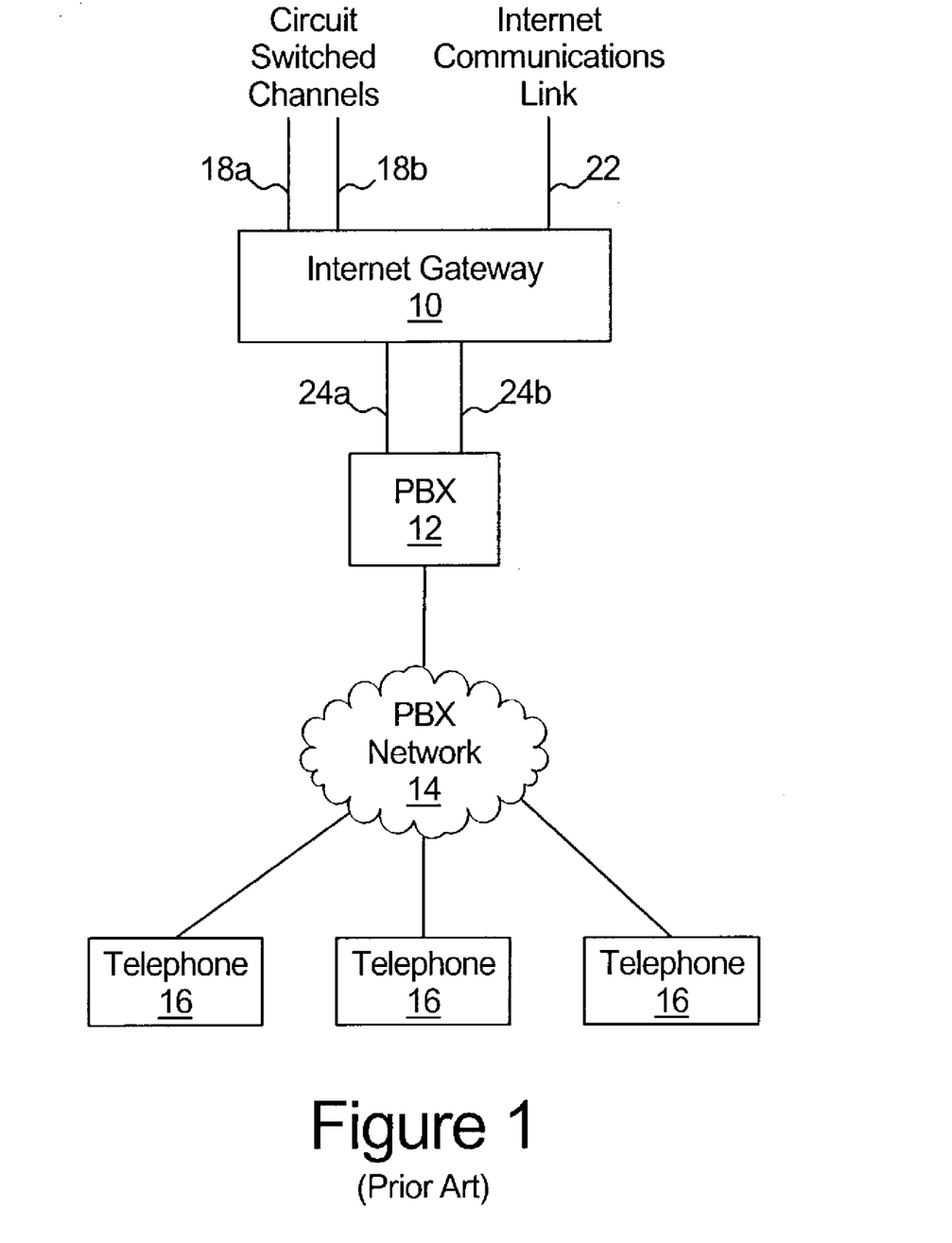
FIG. 1 is a block diagram representing a prior art Internet telephony gateway system.

To enable Internet telephone service to interoperate with a customer's traditional PBX system and with the PSTN central office, Internet gateways have been developed. Referring to FIG. 1, The Internet gateway 10 is coupled to the customer's PBX 12 by one or more traditional ISDN lines 24a and 24b. The gateway 10 is also coupled to a PSTN central office by two or more traditional ISDN lines 18a and 18b and to the Internet by an Internet communication link 22.

The PBX manages a private network 14 that interconnects the PBX 12 to a plurality of telephones 16. In operation, when a call is placed outbound from the PBX 12, the IP gateway 10 selects whether to complete the call to its destination utilizing the PSTN or the Internet. When a call is placed on the PSTN to a telephone number associated with the all of the multiple ISDN lines 18a and 18b (e.g. a pilot number), the PSTN central office will hunt for an open channel first on line 18a and then on line 18b to complete the call. The PSTN central office will only return a busy signal to the caller if all of the open channels within the hunt group are in use. In turn, the gateway 10 will hunt for an open channel first on line 24a and then on line 24b to complete the call to the PBX 12.

A problem exists in that if several calls are in progress over the Internet, it is possible for all of the media channels on lines 24a and 24b to be in use while one or more of the media channels on lines 18a or 18b remain open. In which case, the central office will not provide the applicable busy signal to the caller, but instead will attempt to signal the call for one of the open media channels of lines 18a ore 18b. In this situation, the gateway 10 can not connect the call because the media channels of lines 24a and 24b are all in use. This situation can cause a hunt failure in which the PSTN central office will not hunt the failed channel for future calls. This is a problematic situation in that it disrupts the useful hunt function offered by telephone service providers.

As such, there exists a need for an Internet telephony gateway system that includes a mechanism for deactivating channels to the PSTN central office from time to time such that the PSTN central office does not attempt to hunt and complete calls on such deactivated channels and enable re-activating channels when the channels are available for hunting and completing calls.

SUMMARY OF THE INVENTION

A first aspect of the present invention is to provide a communication channel management system. The system includes a coupling to a private telephone network by a plurality of user communication lines, a coupling to a PSTN central office switch by a plurality of PSTN communication lines, and coupling to the Internet by a packet switched communication line.

The communication management system may be embodied in a gateway whereby the private telephone network is controlled by a PBX and the user communication lines are ISDN lines to the PBX. Alternatively, the communication management system may be embodied in a PBX and the user communication lines are part of the network interconnecting the PBX with a plurality of telephone handsets.

The communication management system comprises a PSTN interface, a VoIP interface, and a private telephone interface. The PSTN interface couples to the plurality of PSTN communication lines and generating PSTN channel signaling and PSTN channel media communications. The VoIP interface couples to the packet switched communication line for generating VoIP channel signaling and VoIP media communications. The private telephone interface couples to the plurality of user communication lines and generates private telephone channel signaling and private telephone channel media communications.

The communication management system further includes a management module for routing each outbound call from the private telephone interface to one of the PSTN interface or the VoIP interface and for routing each inbound call detected by the PSTN interface to the private telephone interface.

The management module further operates a hunting diversion function by: i) detecting a status of the user communication lines to determine whether all of a plurality of user communication channels associated with a hunting group are in use; ii) providing a hunting diversion message to the PSTN central office in response to determining that all user channels associated with the hunting group are in use; iii) detecting that at least one user channel associated with the hunting group is available for an inbound call; and iv) providing a hunting enable message to the PSTN central office in response to determining that at least one user channel associated with the hunting group is available for an inbound call.

Each PSTN communication line may be an ISDN line with a plurality of media communication channels and a data cannel. Each of the PSTN channel signaling, the hunting diversion message, and the hunting enable message may be communicated on the data channel of one of the ISDN lines.

The hunting diversion message and the hunting enable message may be of a same message format, such as a known ISDN Dedicated for Making Outgoing Call only Control message. In which case, the message causes the PSTN central office to toggle a state of the channel between a state wherein it is included within the hunting group and a state wherein it is excluded from the hunting group.

A second aspect of the present invention is to provide a method of diverting a hunting function of a PSTN central office in the event a channel within a hunting group is available but a call can not be completed. The method comprises: i) detecting a status of a plurality of user channels to determine whether all user channels associated with the hunting group are in use; ii) providing a hunting diversion message to the PSTN central office in response to determining that all user channels associated with the hunting group are in use; iii) detecting at least one user channel associated with the hunting group is available for an inbound call; iv) providing a hunting enable message to the PSTN central office in response to determining that at least one user channel associated with the hunting group is available for an inbound call.

The hunting diversion message and the hunting enable message may be of a same message format, such as a known ISDN Dedicated for Making Outgoing Call only Control message. In which case, the message causes the PSTN central office to toggle a state of the channel between a state wherein it is included within the hunting group and a state wherein it is excluded from the hunting group.

For a better understanding of the present invention, together with other and further aspects thereof, reference is made to the following description, taken in conjunction with the accompanying drawings, and its scope will be pointed out in the appended clams.

DETAILED DESCRIPTION OF THE EXEMPLARY EMBODIMENTS

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

Figure 2:
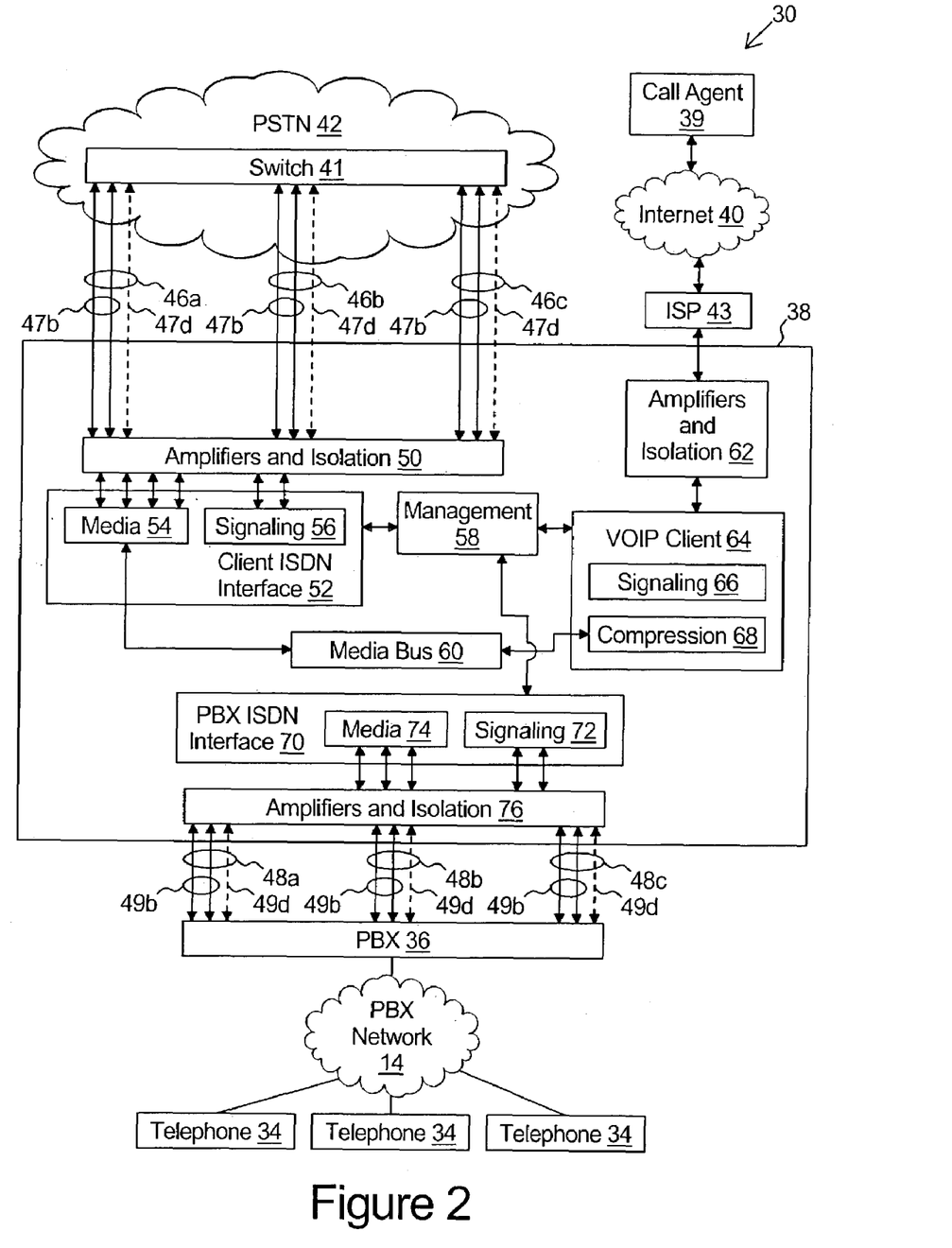
FIG. 2 is a block diagram of an Internet telephony gateway system in accordance with one embodiment of the present invention.

FIG. 2 represents a system 30 for providing telephony service to a plurality of telephone handsets 34. The system 30 comprises a private branch exchange (PBX) switch 36 interconnected with the plurality of telephone handsets 34 by a PBX network 32. The system 30 also includes a communication management system 38 (herein after referred to as gateway 38) coupled to the PBX switch 36 by one or more user lines such as PBX ISDN lines 48a-48c. The gateway 38 couples to a PSTN central office switch 52 by one or more PSTN ISDN lines 46a-46c and to the Internet Service Provider (ISP) 40 by an appropriate data connection 44 (which could also be an ISDN line).

It should be appreciated that ISDN communication protocols provide for multiple time division media channels plus a data channel on the same physical media. The multiple media channels and the data channel of the PBX ISDN lines 48a-48c are represented by PBX media channels 49b and data channels 49d. The multiple media channels and the data channel of the PSTN ISDN lines 46a-46c are represented by PSTN media channels 47b and data channels 47d.

In operation, calls placed by any of the telephone handsets 34 are routed to the PBX switch 36 and then to the gateway 38. The gateway 38 routes the outgoing call to either the PSTN central office switch 41 for completing the call on the PSTN 42 or to a call agent 39 for completion of the call as a VoIP call over the Internet 40.

The PBX switch 36, the PBX network 32, and the telephone handsets 34 may be components of any of a plurality of known private branch exchange telephone systems which provide telephone service to a plurality of handsets utilizing a trunk line to a telephone company central office switch. Examples of such a PBX system include a system known as Digit Pv-Ex marketed by Tamura Electric Works Ltd. of Japan. As is known in the art, such PBX system will support a greater number of telephone handsets 34 than exist circuit switched channels on the ISDN trunk line. Additionally, the PBX system should support a telephone company central office system known as "Hunting".

Hunting is a system whereby a plurality of the circuit switched channels within the trunk line will be associated with a single "pilot" number. The "pilot" number is typically the main number of a business. By assigning a plurality of channels to the same "pilot" number, a plurality of callers may call the company utilizing the "pilot" number and each will be connected on a separate one of the channels. No caller to the "pilot" number will receive a busy signal unless all of the channels are in use.

The hunting system is implemented by the telephone company central office switch. When a caller calls the "pilot" number, the central office switch will "hunt" for one of the circuit switched channels within the trunk that is assigned to the "pilot" number and that is not already in use. The central office switch will only provide a busy signal to the caller if all of the channels associated with the "pilot" number are in use.

The PSTN central office switch 41 is a known central office switch that supports ISDN trunk lines to a customer's system, supports associating multiple channels to a single pilot number, and supports the hunting system described above.

Also, for purposes of the exemplary embodiment of the present invention, it is useful for the PSTN central office switch 41 to support toggling a particular PSTN media channel 47b between a state wherein it is reserved for outbound calls only (e.g. the central office switch 41 will not attempt to signal an inbound call for the particular channel) and a state wherein it can support both inbound and outbound calls. A known message referred to as an "Inform—Dedicated to Making Outgoing Calls Only Control" message may be received by the central office switch 41 and the central office switch will toggle the state of the PSTN media channel 47b in response thereto.

The ISP Server 43 is a known ISP system that utilizes TCP/IP protocols for interconnecting a client, such as the gateway 38, with remote devices which are coupled to the Internet 40. The call agent 39 may include known combinations of soft switch technologies, trunking gateway technologies, and signaling gateway technologies for interconnecting between PSTN call legs and VoIP call legs.

The gateway 38 of the present invention is coupled between the PBX system 36 and the PSTN central office switch 41. The gateway operates to: i) couple incoming calls from the PSTN central office switch 41 to the PBX system 36; and ii) route outgoing calls from the PBX system 36 to either the PSTN central office switch 41 or the Internet 40.

Further, the gateway 38 of the present invention provides a hunting diversion function. More specifically, PSTN media channels 47b within a hunting group associated with a particular pilot number between the gateway 38 and the PSTN central office switch 41 remain open, but all PBX media channels 49b associated with the hunting group between the gateway 38 and the PBX system 36 are in use (e.g. FiC for each PSTN media channel 47b within the hunting group is zero—as discussed herein), the gateway 38 may provide a diversion message to the PSTN central office switch 41 that invokes a function on the PSTN central office switch that removes the open channels from the hunting group such that a busy signal will be provided to inbound callers on the pilot number.

Thereafter, when a PBX media channel 49b associated with the hunting group between the gateway 38 and the PBX system 36 opens up (e.g. the FiC for each PSTN media channel 47b within the hunting group increases by one—discussed herein), the gateway 38 may send an enable message to the PSTN central office switch 41 that invokes a function on the PSTN central office switch that reinstates the open PSTN media channels 47b to the hunting group.

In the exemplary embodiment, both the diversion message and the enable message may be the previously discussed Inform-Dedicated to Making Outgoing Calls Only Message which toggles the state of the media channel.

Gateway

The Gateway 38 comprises a PSTN interface 52 for communicating with the PSTN central office switch 41 over each PSTN ISDN line 46a-46c, a private telephone interface 70 for communicating with the PBX over each PBX ISDN line 48a-48c, a VoIP interface 64 for communicating with the call agent 39 (and other remote VoIP devices) over the Internet 40, a time division media bus 60 interconnecting each of the PSTN interface 52, the private telephone interface 70, and the VoIP interface 64, and a management module 58.

The PSTN interface 52 is a known in the art ISDN integrated circuit (e.g. chip set and appropriate operating drivers) that includes a media module 54 for generating ISDN digital media communication signals on each of the PSTN media channels 47b and a signaling module 56 for generating ISDN compliant messages on the data channels 47b of the ISDN lines 46a-46c. The PSTN interface 52 operates as a client ISDN device to the PSTN central office switch 41. A block of amplifiers and isolation circuits couple between the first IDSN interface 52 and the IDSN lines 46a-46c.

The private telephone interface 70 is also a known in the art ISDN integrated circuit (e.g. chip set and appropriate operating drivers) that includes a media module 74 for generating ISDN digital media communication signals on each of the PBX media channels 49b and for generating ISDN compliant messages on the data channels 49d of the ISDN lines 48a-48c. The second ISDN interface 70 emulates the ISDN functions of a PSTN central office switch when interfacing with the PBX system 36. A block of amplifiers and isolation circuits 76 couple between the first IDSN interface 72 and the IDSN lines 48a-48c.

The VoIP interface 64 comprises a signaling translation module 66 and a compression-decompression module 68 which, in combination, convert between: i) call signaling messages and digital audio media exchanged with the private telephone interface 70 and ii) VoIP signaling and compressed audio media exchanged with the remote VoIP device via the Internet 40.

The signaling translation module 66 converts between call signaling messages exchanged with the private telephone interface 70 and VoIP call signaling messages exchanged with a call agent 39 coupled to the Internet 40.

The compression-decompression module 68 operates algorithms which convert between the digital audio media exchanged with the private telephone interface 70 and the compressed digital audio that may be transmitted over a VoIP call leg between the VoIP interface 60 and the remote VoIP device. Exemplary compression-decompression algorithms utilized by the compression-decompression module 68 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G. 729E.

The time division multiplex bus (TDM bus) 60 interconnects between the media module 54 of the PSTN interface 52, the media module 74 of the private telephone interface 70 and the compression module 68. The TDM bus 60 supports the transfer of digital media data between such components on separate time division channels to support the media session of a call through the gateway 38. The TDM bus 60 may be a synchronous full duplex communication line supporting frame transfer of media data and control data. An exemplary TDM bus 60 may be a four wire serial interface bus operating in accordance with a standard known as 10M-2 which has been developed to support media, control and programming, and status channel communications between telecommunication integrated circuits.

The management module 58 control operation of the gateway 38. More specifically, the management module 58: i) controls the routing of outbound calls from the PBX system 36 to either the PSTN central office switch 41 or to the call agent 39, ii) controls the routing of inbound calls from the PSTN central office switch 41 to the PBX system 36, iii) provides the above discussed hunting diversion message to the PSTN central office switch 41 in the event that all PBX media channels 49b associated with a hunting group between the gateway 38 and the PBX 36 are in use; iv) and provides a hunting enable message to the PSTN central office switch 41—after providing a hunting diversion message—when PBX media channels 49b between the gateway 38 and the PBX system 36 become open.

Routing and Grouping

Figure 4:
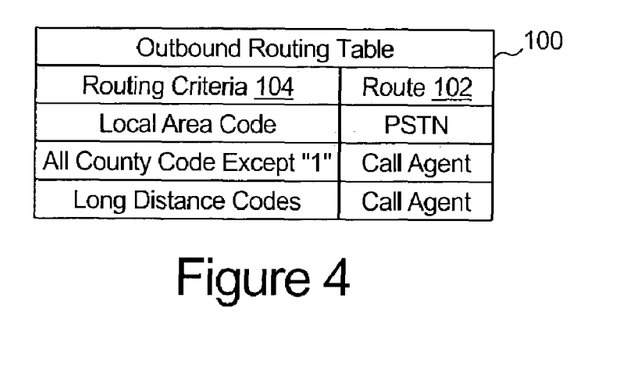
FIG. 4 is an exemplary outbound call routing table in accordance with one embodiment of the present invention.
Figure 5:
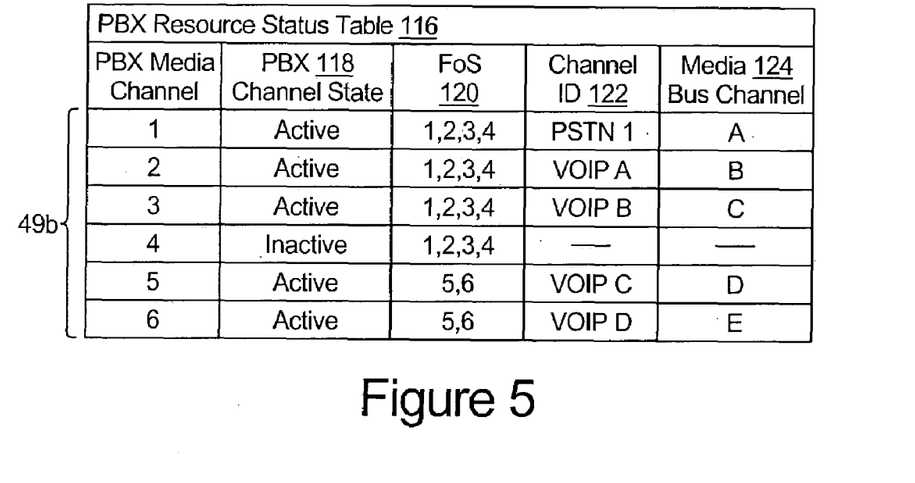
FIG. 5 is an exemplary PBX resource status table in accordance with one embodiment of the present invention.
Figure 6:
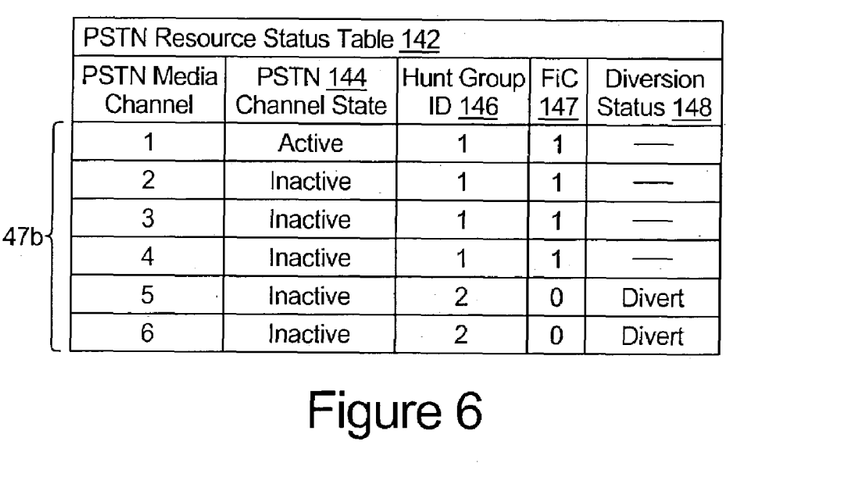
FIG. 6 is an exemplary PSTN resource status table in accordance with one embodiment of the present invention.

The tables of FIGS. 4-6 represent criteria utilized by the management module for routing and grouping. More specifically, the table of FIG. 4 represents an exemplary outbound call routing table 100. The routing table 100 associates a route 102 with various routing criteria 104. The routing criteria 104 may be based on the destination telephone number. The route 102 will be either the PSTN central office switch 41 or the call agent 39. Example routing criteria 104 and routes 102 may include routing all calls with a destination number that has a local area code to the PSTN central office switch 41, routing all calls with a destination number that has a country code other than "1" to the call agent 39, and routing all calls with an area code that is non-local to the call agent 39. More complex routing schemes may include routing calls with a toll free area code, a toll free exchange, and emergency numbers to the PSTN central office switch 41.

The table of FIG. 5 represents an exemplary PBX resource status table 116. The PBX resource status table 116 associates various elements of information to each PBX media channel 49b of the PBX ISDN lines 48a-48c. The elements of information may comprise: i) an activity indication 118 identifying whether the PBX media channel 49b is active or inactive, ii) a fan-out set (FoS) 120 which is an indication of those PSTN media channels 47b within ISDN lines 46a-46c that are associated with the PBX media channel 49b (e.g. available for completing inbound and outbound calls), iii) a channel identification 122 identifying the corresponding PSTN media channel 47b if the PBX media channel 49b is active and supporting a call between the PSTN 42 and the PBX 36 or identification of the IP channel if the PBX media channel 49b is active and supporting a call between the Internet 40 and the PBX 36, and iv) a media bus channel ID 124 identifying a channel of the time division media bus 60 supporting the call if the channel 49b is active.

The table of FIG. 6 represents an exemplary PSTN resource status table 142. The PSTN resource status table 142 associates various elements of information to each PSTN media channel 47b within the ISDN lines 46a-46c. The elements of information may comprise: i) a channel state indication 144 identifying whether the media channel 47b is active or inactive, ii) a hunt group identifier 146 identifying a particular hunting group or PSTN pilot number with which the PSTN media channel 47b is associated, iii) a fan-in count 147 which is a number indicating the quantity of PBX media channels 49b within ISDN lines 48a-48c that associate with the media channel 47b (as per the PBX resource status table 116, column 120) and are currently inactive (as per the PBX resource status table 116, column 118), and iv) a diversion status identifier 148 indicating whether the channel 47b is currently in a diversion status.

Outbound Call Routing

Figure 7:
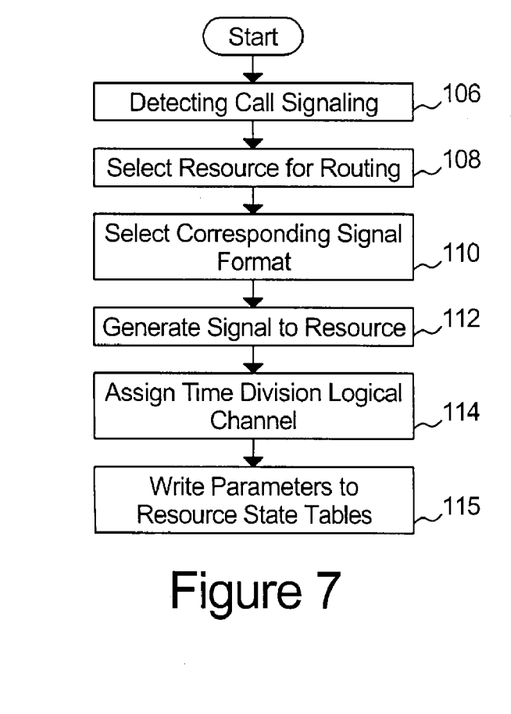
FIG. 7 is a flow chart representing outbound call routing in accordance with one embodiment of the present invention.

The flow chart of FIG. 7 represents exemplary steps performed by the management module 58 for routing outbound calls from the PBX system 36 to either the PSTN central office switch 41 or to the call agent 39. Step 106 represents detecting call signaling from the PBX system 36 on a data channel 49d. More specifically, the call signaling detected may be an indication, such as a processing call, from the signaling module 72 of the private telephone interface 70 indicating that call signaling has been received on a data channel 49d. The call signaling may indicate a particular media channel 49b on which the call is to be established.

Step 108 represents selecting a route 102 from the routing table 100 based on comparing the destination number from the call signaling message to the routing criteria 104. And, if the routing is to the PSTN central office switch 41, a particular PSTN media channel 47b will be selected.

Step 110 represents selecting a corresponding call signaling message format that complies with the selected route 102. For example, if the call will be routed to the PSTN central office switch 41, the corresponding call signaling format will be an ISDN compliant call signaling message. Alternatively, if the call will be routed to the call agent 39, the corresponding call signaling format will be an appropriate VoIP call signaling message.

Sep 112 represents generating a corresponding call signaling message by combining the call signaling message content (e.g. destination number) with the format selected at step 110 and providing the corresponding call signaling message to either the call agent 39 or the PSTN central office switch 41. More specifically, if the call signaling message is to be provided to the call agent 39, the message from the management module 58 is provided to the signaling module 66 of the VoIP interface 64 for formatting and transmission as an IP frame. If the call signaling message is to be provided to the PSTN central office switch 41, the message from the management module 58 is provided to the signaling module 56 of the PSTN interface 52 for formatting and transmission on the particular data channel 47$d$ associated with the selected PSTN media channel 47$b$.

Step 114 represents assigning a time division channel on the time division media bus 60 to the session. Assigning the time division channel also includes providing identification of the channel to the media module 74 of the private telephone interface 70 and to either the media module 54 of the PSTN interface 52 or the compression module 68 of the VoIP interface 64 such that the media data representing the call may be transferred on the bus 60.

Step 115 represents writing call parameters to the PBX resource status table 116 and to the PSTN resource status table 142. More specifically, upon setting up an outbound call: i) the channel state 118 of the media channel 49$b$ will be changed from inactive to active, ii) the channel ID 122 will be updated to identify the media channel 47$b$ or the VoIP channel through which the call is completed, iii) the media bus channel ID 124 will be updated to identify the particular media bus channel through which the call is completed, iv) the PSTN channel state of the PSTN media channel 47$b$ will be changed from inactive to active, and v) the FiC count 147 for each other PSTN media channel 47$b$ will be updated to reflect the media channel 49$b$ becoming active.

If updating the FiC count 147 for each PSTN media channel 47$b$ results in the Fic count for any PSTN media channel 47$b$ becoming zero, such PSTN media channel 47$b$ will be diverted as discussed in more detail below.

Inbound Call Routing

Figure 8:
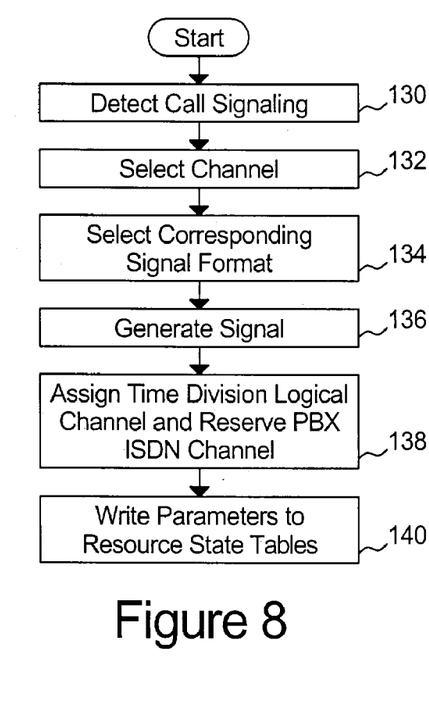
FIG. 8 is a flow chart representing exemplary inbound call routing in accordance with one embodiment of the present invention.

The flow chart of FIG. 8 represents exemplary operation of the management module 58 for routing an inbound call from the PSTN central office switch 41 to the PBX system 36.

Step 130 represents detecting call signaling from the PSTN central office switch 41. More specifically, the call signaling detected may be an indication, such as a processing call, from the signaling module 58 indicating that call signaling has been received on a data channel 47$d$. The call signaling may identify a particular PSTN media channel 47$b$ on which the call will proceed.

Step 132 represents selecting a PBX media channel 49$b$ for routing the call to the PBX 36. More specifically, referring to FIG. 5, selecting a PBX media channel 49$b$ may include selecting a particular media channel that is both: i) in an inactive state 118, and ii) includes the PSTN media channel 47$b$ (identified in the call signaling form the PSTN central office switch 41) as part of its FoS 120.

Step 134 represents selecting a corresponding call signaling message format for providing the call signaling to the PBX 36 and step 136 represents generating a corresponding call signaling message to the PBX 36 on the data channel 49$d$ associated with the selected media channel 49$b$.

Step 138 represents assigning a time division channel on the time division media bus 60 to the session. Again, assigning the time division channel also includes providing identification of the channel to the media module 74 of the private telephone interface 70 and to the media module 54 of the PSTN interface 52 such that the media data representing the call may be transferred on the bus 60.

Step 140 represents writing the call parameters to the PBX resource status table 116 and the PSTN resource status table 142. Similar to when an outbound call is established: i) the channel state 118 of the PBX media channel 49$b$ will be changed from inactive to active, ii) the channel ID 122 will be updated to identify the PSTN media channel 47$b$ through which the call is completed, iii) the media bus channel ID 124 will be updated to identify the particular media bus channel through which the call is completed, iv) the channel state of the PSTN media channel 47$b$ will be changed from inactive to active, and v) the FiC count 147 for each other PSTN media channel 47$b$ will be updated to reflect the PBX media channel 49$b$ becoming active.

Again, if updating the FiC count 147 for each PSTN media channel 47$b$ results in the FiC count for any PSTN media channel 47$b$ becoming zero, such PSTN media channel 47$b$ will be diverted as discussed in more detail below.

Call Termination

When a call is terminated, the management module 58 will update both the PBX resource status table 116 and the PSTN resource status table 142 to reflect the availability of resources. More specifically: i) the channel state 118 of the PBX media channel 49$b$ will be changed from active to inactive, ii) the channel ID 122 will be updated to reflect a null value, iii) the media bus channel 124 will be updated to reflect a null value, iv) each of the FiC values 147 will be updated to reflect the availability of the PBX media channel 49$b$, and v) if the call terminated was a PSTN call, the PSTN channel state 144 associated with the PSTN channel 47$b$ will changed form active to inactive.

If updating the FiC count 147 for each media channel 47$b$ results in the FiC count for any media channel 47$b$ changing from zero to a value greater than zero, such channel 47$b$ will be enabled as discussed in more detail below.

Hunting Diversion

The management module further operates a hunting diversion function by: i) detecting a status of the user communication lines to determine whether all of a plurality of user communication channels associated with a hunting group are in use; ii) providing a hunting diversion message to the PSTN central office in response to determining that all user channels associated with the hunting group are in use; iii) detecting that at least one user channel associated with the hunting group is available for an inbound call; and iv) providing a hunting enable message to the PSTN central office in response to determining that at least one user channel associated with the hunting group is available for an inbound call.

Implementing such hunting diversion may utilize the FiC values 147 of the PSTN resource status table 142. For example, both media channels 47$b$-5 and 47$b$-6 within the PSTN resource status table 142 are inactive. These channels are part of hunting group number 2. Simultaneously, both of the two PBX media channels 49$b$-5 and 49$b$-6 that associate with hunting group number 2 (e.g. include PSTN media channels 49$b$-5 and 49$b$-6 within their FoS 120) are active on VoIP calls and therefore neither is available for completing an inbound call from the PSTN central office switch 41. Therefore, both of such PSTN media channels 47$b$-5 and 47b-6 have an FiC value of "zero" and are diverted such that the PSTN central office switch 41 will not attempt to hunt those channels for an inbound call and instead will provide an inbound caller with a busy signal.

In contrast, the PSTN media channels 47b-2, 47b-3, and 47b-4 within the PSTN resource status table 142 are also inactive. However, these channels are part of hunting group number 1. At least one of the four PBX media channels 49b-1, 49b-2, 49b-3, and 49b-4 associated with hunting group number 1 (e.g. include PSTN media channels 49b-1, 49b-2, 49b-3, and 49b-4 within their FoS 120) is inactive and available for completion of a call from the PSTN central office switch 41. PBX media channel 49b-4 is inactive. As such, the PSTN media channels 47b-2, 47b-3, and 47b-4 are enabled such than an inbound call can be completed.

When the FiC value 147 associated with a media channel 47b is updated to zero, hunting will be diverted. When the FiC value 147 associated with a media channel 47b is updated from zero to a value greater than zero, hunting will be enabled.

Figure 9:
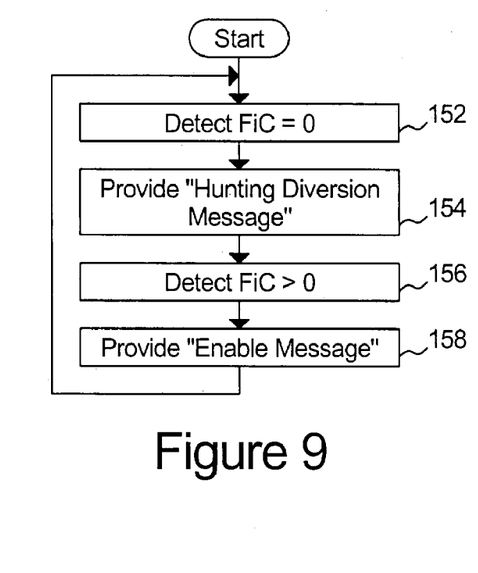
FIG. 9 is a flow chart representing exemplary operation of a management module providing hunting diversion in accordance with one embodiment of the present invention.
Figure 11:
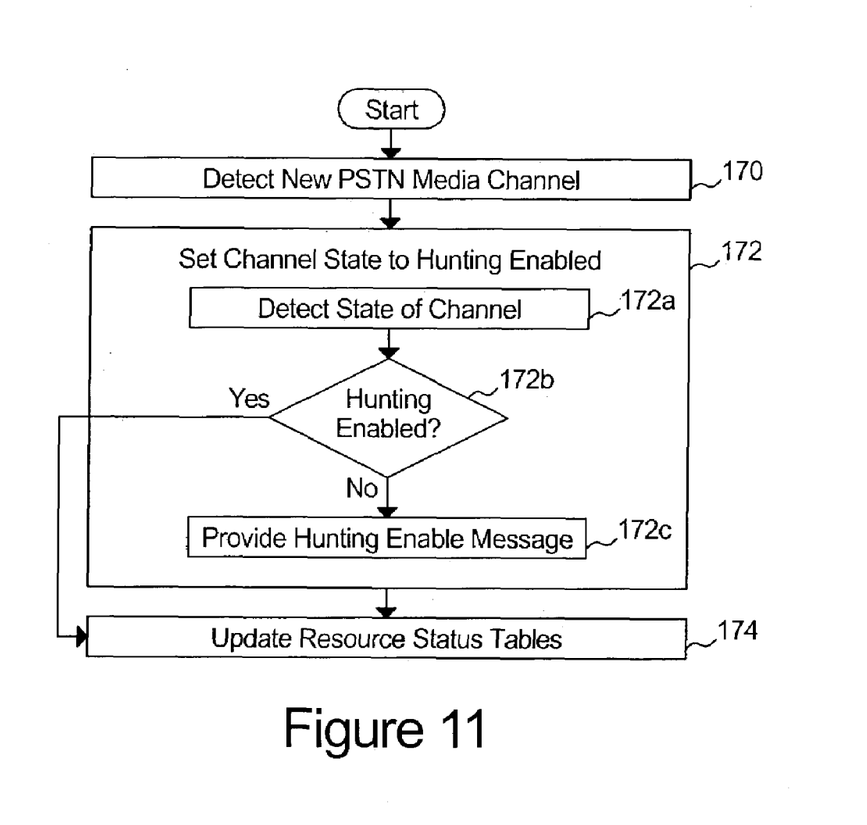
FIG. 11 is a flow chart representing exemplary operation of a management module upon power up or detection of a new PSTN media channel in accordance with one embodiment of the present invention.

The flowcharts of FIGS. 9 and 11 represent exemplary operation of the management module 58 for diverting and enabling hunting. More specifically, the flow chart of FIG. 11 represents operation of the management module 58 upon power up or detection of a new PSTN media channel 47b to assure that the new media channel 47b is set to the proper state of "outgoing calls only—hunting diverted" state or "hunting enabled" state. Step 170 represents detecting the new PSTN media channel 47b. Such detection may be recognizing the new channel through traditional ISDN "hand shaking" protocols at power-up of the system 38 or upon connecting a new line 46 to the system 38.

Step 172 represents providing the applicable message(s) to the PSTN central office switch 41 to assure that the new channel 47b is set to a known hunting state or, more specifically to the hunting enabled state. An exemplary combination of messages for setting the new channel 47b to the hunting state may include first sending a status detection message to the PSTN central office switch 41 and receiving a response at sub step 172a. Based on the response, step 172b represents determining whether the current state is hunting enabled at step 172b. If hunting is not enabled, the management module 58 provides a hunting enable message at sub step 172b. As will be discussed below, the hunting enable message may be a DMOCOC messages.

Step 174 represents updating both the PBX resource status table 116 and the PSTN resource status table 142 to reflect the availability of the new channel 47b. More specifically this may include adding the new channel 47b to the PSTN resource status table 142 and adding the new channel 47b to the applicable PBX media channel FoS set(s) 120.

The flow chart of FIG. 9 represents exemplary steps performed by the management module 58 for diverting and enabling hunting during operation of the system 38. Step 152 represents the management module 58 detecting that the FiC value for any particular PSTN media channel 47b changing to zero. This step may be performed by the management module 58: i) monitoring the PSTN resource status table 116 to detect the FiC 147 changing to zero, ii) detecting a flag indicating that an FiC value 147 changing to zero, or iii) otherwise monitoring the FiC channel state of each PSTN media channel 47b.

Step 154 represents providing a "hunting diversion message" to the PSTN central office switch 41 to divert the PSTN media channel 47b to which its FiC value 147 became zero. The "hunting diversion message" may be any message that is part of the application interface to the PSTN central office switch 41 and which invokes processing within the PSTN system that effectively prevents the PSTN central office switch 41 from hunting the PSTN media channel 47b and instead causes the PSTN central office switch 41 to provide callers on the pilot number with a busy signal. The message may identify the hunting group or may identify the media channels 47b within the hunting group to which the diversion message applies.

One example of such a message is a known "Inform" message that activates a Dedicated to Making Outgoing Calls Only Control (DMOCOC) feature for an inactive PSTN channel 47b. Such a message sent for each channel 47b will be cause the PSTN central office switch 41 to assign each such channel 47b an outgoing call only state and thereby deactivate the channel from the hunting group. Once deactivated, the PSTN central office switch 41 will provide a busy signal to a caller on the pilot number rather than continue hunting. Further, because the hunting has not failed (all lines are detected as busy rather than failure), the entire hunting process will remain active for future calls on the pilot number.

Step 156 represents the management module 58 detecting that the FiC value for any particular PSTN media channel 47b changing from zero to one. This step may be performed by the management module 58: i) monitoring the PSTN resource status table 116 to detect the FiC 147 changing form zero to one, ii) detecting a flag indicating that an FiC value 147 changing from zero to one, or iii) otherwise monitoring the FiC channel state of each channel 47b.

Step 158 represents providing a "hunting enable message" to the PSTN central office switch 41. The "hunting enable message" may be any message that is part of the application interface to the PSTN central office switch 41 and which invokes processing within the PSTN system that effectively reverses the effect to the "hunting diversion message" of step 154 for the PSTN media channel 47b.

One example of a "hunting enable message" is the same "Inform" message that activates a Dedicated to Making Outgoing Calls Only Control (DMOcentral officeC) feature for a channel. Such a message sent for a channel 47b that is already in an "outgoing call only state" will "toggle" the channel 47b back to a state wherein it can accept incoming calls. This enables the channel 47b to be included within the hunting group.

It should be appreciated that the above described systems and methods provide for a gateway to divert open PSTN channels from a hunting group associated with a pilot number when no PBX channels are available for completing the call in a manner that provides for the caller to receive a busy signal and in a manner that does not deactivate the hunting process upon receipt of another call on the pilot number.

Embodiment in a PBX with Hunting Diversion

Figure 3:
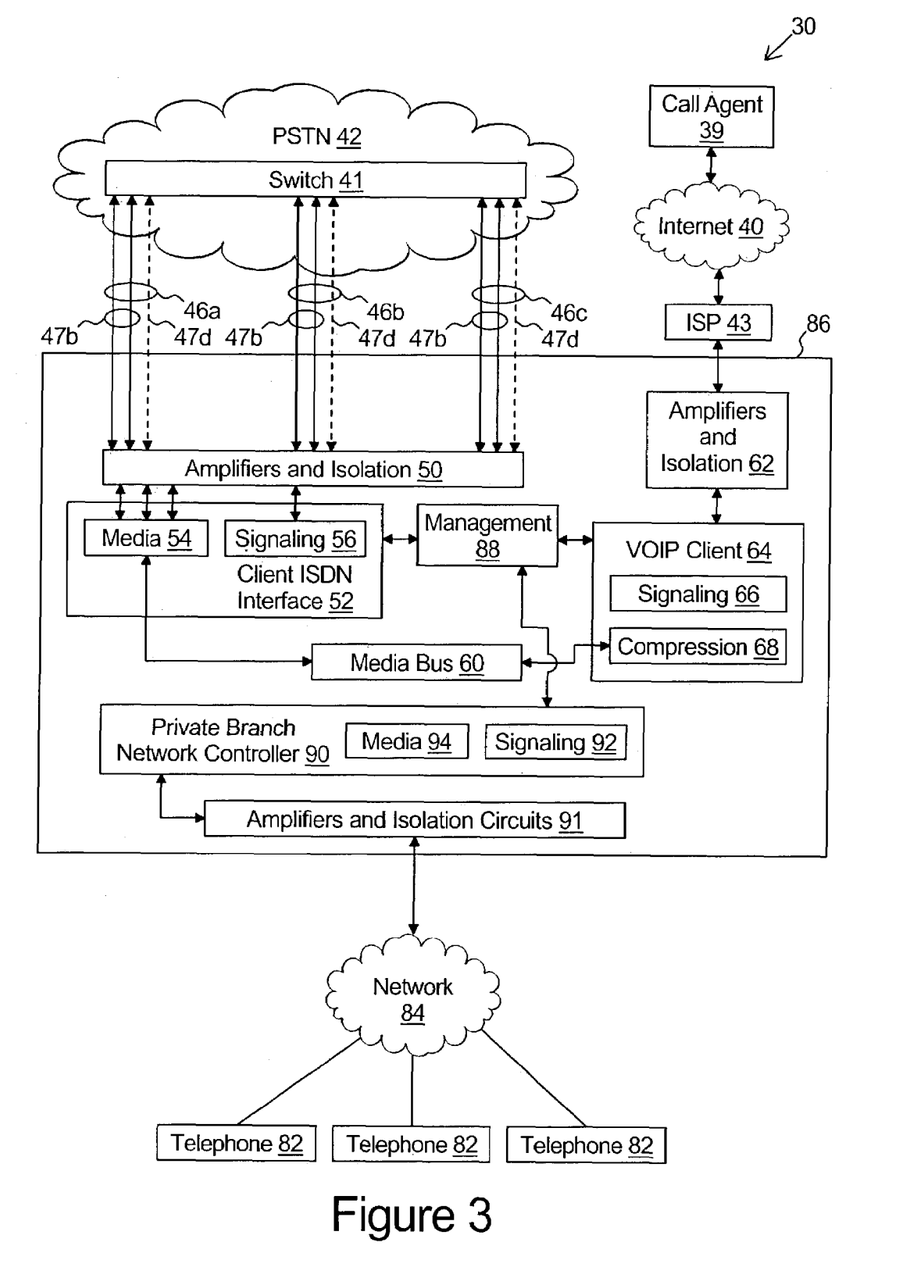
FIG. 3 is a block diagram of a private branch exchange system in accordance with one embodiment of the present invention.

The block diagram of FIG. 3 represents an alternative system 80 for providing telephone service to a plurality of handsets 82.

The system 80 comprises a communication management system embodied as a private branch exchange (PBX) switch 86. The PBX switch 86 is interconnected with the plurality of user lines such as telephone extension 82 of a PBX network 84. The PBX switch 86 couples to a PSTN central office switch 41 by one or more ISDN lines 46a-46c and to the Internet Service Provider (ISP) 40 by an appropriate data connection 44 (which could also be an ISDN line).

In operation, calls placed by any of the extensions 82 are routed to the PBX switch 86. The PBX switch 86 routes the outgoing call to either the PSTN central office switch 41 for completing the call on the PSTN 42 or to a call agent 39 for completion of the call as a VoIP call over the Internet 40.

The PBX switch 86 and the network 84 may be have similar structure to the PBX switch 36 discussed with respect to FIG. 2 and include the additional structure discussed herein. More specifically, the PBX switch 86 includes structure that provides for: i) coupling incoming calls from the PSTN central office switch 41 to an extension 82; and iii) routing outgoing calls from an extension 82 to either the PSTN central office switch 41 or the Internet 40.

Further, the PBX switch 86 of the present invention provides a hunting diversion function. More specifically, when media channels 47*b* within a hunting group associated with a particular pilot number between the PSTN central office switch 41 and the PBX switch 86 remain open, but all extensions 82 associated with the hunting group are in use, the PBX switch 86 may provide a diversion message to the PSTN central office switch 41 that invokes a function on the PSTN central office switch 41 that removes the open channels 47*b* from the hunting group such that a busy signal will be provided to inbound callers on the pilot number.

Thereafter, when an extension 82 associated with the hunting group becomes available, the PBX switch 86 may send an enable message to the PSTN central office switch 41 that invokes a function on the PSTN central office switch 41 that reinstates the open channels 47*b* to the hunting group.

As previously discussed, both the diversion message and the enable message may be an Inform-Dedicated to Making Outgoing Calls Only Message which toggles the state of the PSTN media channel 47*b*.

The PBX switch 86 comprises a PSTN interface 52 and a VoIP interface 64, amplifier and isolation circuits 50 and 62, and a media bus 60 all as discussed above with respect to FIG. 2.

The PBX switch 86 further includes a private branch network controller 90 which controls signaling and media transfer between the PBX switch 86 and each of the extensions 82. The private branch network controller 90 comprises a media module 94 and a singling module 92. The signaling module 92 generates signaling messages compliant with the network 84 for initiating telephone calls between an extension 82 and a remote endpoint on the PSTN 42 or the Internet 40. The media module generates analog or digital media communication signals on the network 84 for supporting telephone calls between an extension 82 and a remote endpoint on the PSTN 42 or the Internet 40.

The management module 88 control operation of the PBX switch 86. More specifically, the management module 88: i) controls the routing of outbound calls from a telephone handset 82 to either the PSTN central office switch 41 or to the cal agent 39, ii) controls the routing of inbound calls from either the PSTN central office switch 41 to an extension 82, iii) provides the above discussed hunting diversion message to the PSTN central office switch 41 in the event that all telephone handsets 82 associated with a hunting group between the PBX switch 86 and the PSTN central office switch 41 are in use; and iv) provides a hunting enable message to the PSTN central office switch 41—after providing a hunting diversion message—when at least one extension 82 associated with the hunting group becomes available.

The processes performed by the management module 88 for routing outbound calls is similar to that discussed above with respect to FIG. 7. Step 106 represents detecting call signaling from one of the extensions 82. More specifically, the call signaling detected may be an indication, such as a processing call, from the signaling module 92 of the private branch network controller 90 indicating that call signaling has been received from one of the extensions 82.

Step 108 represents selecting a route 102 from the routing table 100 based on comparing the destination number from the call signaling message to the routing criteria 104. And, if the routing is to the PSTN central office switch 41, a particular PSTN media channel 47*b* will be selected.

Step 110 represents selecting a corresponding call signaling message format that complies with the selected route 102. For example, if the call will be routed to the PSTN central office switch 41, the corresponding call signaling format will be an ISDN compliant call signaling message. Alternatively, if the call will be routed to the call agent 39, the corresponding call signaling format will be an appropriate VoIP call signaling message.

Sep 112 represents generating a corresponding call signaling message by combining the call signaling message content (e.g. destination number) with the format selected at step 110 and providing the corresponding call signaling message to either the call agent 39 or the PSTN central office switch 41. More specifically, if the call signaling message is to be provided to the call agent 39, the message from the management module 88 is provided to the signaling module 66 of the VoIP interface 64 for formatting and transmission as an IP frame. If the call signaling message is to be provided to the PSTN central office switch 41, the message from the management module 88 is provided to the signaling module 56 of the PSTN interface 52 for formatting and transmission on the particular data channel 47*d* associated with a selected PSTN media channel 47*b*.

Step 114 represents assigning a time division channel on the time division media bus 60 to the session. Assigning the time division channel also includes providing identification of the channel to the media module 94 of the private branch network controller 90 and to either the media module 54 of the PSTN interface 52 or the compression module 68 of the VoIP interface 64 such that the media data representing the call may be transferred on the bus 60.

Figure 10:
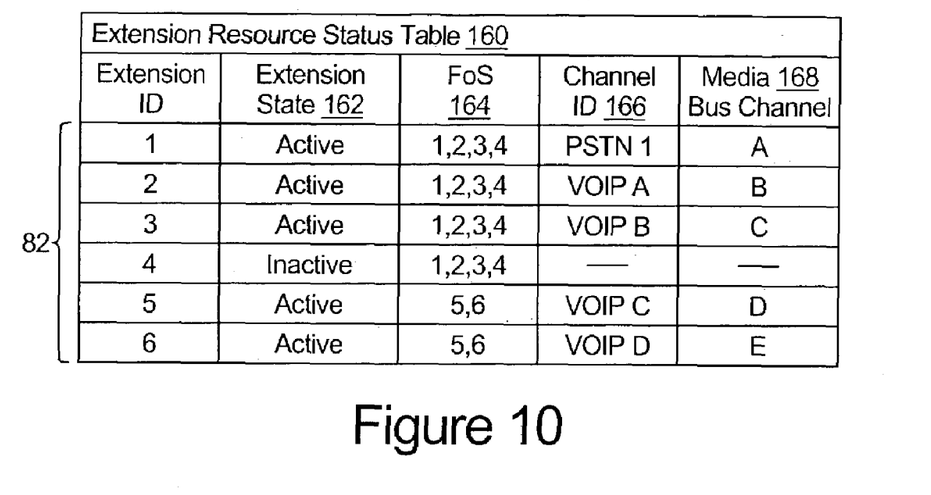
FIG. 10 is an exemplary extension resource status table in accordance with one embodiment of the present invention.

Step 115 represents writing call parameters to the PSTN resource status table 142 and to an extension resource status table 160 as is shown in FIG. 10. More specifically, upon setting up an outbound call: i) an extension state 162 of the extension 82 will be changed from inactive to active, ii) the channel ID 166 will be updated to identify the media channel 47*b* or the VoIP channel through which the call is completed, iii) the media bus channel ID 168 will be updated to identify the particular media bus channel through which the call is completed, iv) the PSTN channel state 144 (FIG. 6) of the PSTN media channel 47*b* will be changed from inactive to active, and v) the FiC count 147 (FIG. 6) for each other PSTN media channel 47*b* will be updated to reflect the extension 82 becoming active.

If updating the FiC count 147 for each PSTN media channel 47*b* results in the FiC count for any PSTN media channel 47*b* becoming zero, such PSTN media channel 47*b* will be diverted.

The processes performed by the management module 88 for inbound outbound calls is similar to that discussed above with respect to FIG. 8. Step 130 represents detecting call signaling from the PSTN central office switch 41. More specifically, the call signaling detected may be an indication, such as a processing call, from the signaling module 58 indicating that call signaling has been received on a data channel 47*d*. The call signaling may identify a particular PSTN media channel 47*b* on which the call will proceed.

Step 132 represents selecting an extension 82 to which the call is to be routed. More specifically, referring to FIG. 10, selecting an extension 82 may include selecting a particular extension 82 that is both: i) in an inactive state 162, and ii) includes the PSTN media channel 47*b* (identified in the call signaling from the PSTN central office switch 41) as part of its FoS 164.

Step 134 represents selecting a corresponding call signaling message format for providing the call signaling to extension 82 and step 136 represents generating a corresponding call signaling message to extension 82.

Step 138 represents assigning a time division channel on the time division media bus 60 to the session. Again, assigning the time division channel also includes providing identification of the channel to the media module 94 of the private branch network controller 90 and to the media module 54 of the PSTN interface 52 such that the media data representing the call may be transferred on the bus 60.

Step 140 represents writing the call parameters to the extension resource status table 160 and the PSTN resource status table 142. Similar to when an outbound call is established: i) the extension state 162 of the extension 82 will be changed from inactive to active, ii) the channel ID 166 will be updated to identify the PSTN media channel 47*b* through Which the call is completed, iii) the media bus channel ID 168 will be updated to identify the particular media bus channel through which the call is completed, iv) the channel state of the PSTN media channel 47*b* will be changed from inactive to active, and v) the FiC count 147 for each other PSTN media channel 47*b* will be updated to reflect the extension 82 becoming active.

Again, if updating the FiC count 147 for each PSTN media channel 47*b* results in the FiC count for any PSTN media channel 47*b* becoming zero, such PSTN media channel 47*b* will be diverted.

When a call is terminated, the management module 88 will update both the extension resource status table 160 and the PSTN resource status table 142 to reflect the availability of resources. More specifically: i) the extension state 162 of the extension 82 will be changed from active to inactive, ii) the channel ID 166 will be updated to reflect a null value, iii) the media bus channel 168 will be updated to reflect a null value, iv) each of the FiC values 147 will be updated to reflect the availability of the extensions 82, and v) if the call terminated was a PSTN call, the PSTN channel state 144 associated with the PSTN channel 47*b* will changed form active to inactive.

If updating the FiC count 147 for each media channel 47*b* results in the FiC count for any media channel 47*b* changing from zero to a value greater than zero, such channel 47*b* will be enabled.

The management module 88 further operates a hunting diversion function similar to as discussed above. The management module operates hunting diversion by: i) detecting a status of the user communication lines to determine whether all of a plurality of user communication channels associated with a hunting group are in use; ii) providing a hunting diversion message to the PSTN central office in response to determining that all user channels associated with the hunting group are in use; iii) detecting that at least one user channel associated with the hunting group is available for an inbound call; and iv) providing a hunting enable message to the PSTN central office in response to determining that at least one user channel associated with the hunting group is available for an inbound call.

Again, implementing such hunting diversion may utilize the FiC values 147 of the PSTN resource status table 142. For example, both media channels 47*b*-5 and 47*b*-6 within the PSTN resource status table 142 are inactive. These channels are part of hunting group number 2. Simultaneously, both of the two extensions 82-5 and 82-6 that associate with hunting group number 2 (e.g. include PSTN media channels 49*b*-5 and 49*b*-6 within their FoS 164) are active on VoIP calls and therefore neither is available for completing an inbound call from the PSTN central office switch 41. Therefore, both of such PSTN media channels 47*b*-5 and 47*b*-6 have an FiC value of "zero" and are diverted such that the PSTN central office switch 41 will not attempt to hunt those channels for an inbound call and instead will provide an inbound caller with a busy signal.

In contrast, the PSTN media channels 47*b*-2, 47*b*-3, and 47*b*-4 within the PSTN resource status table 142 are also inactive. However, these channels are part of hunting group number 1. At least one of the four extensions 82-1, 82-2, 82-3, and 82-4 associated with hunting group number 1 (e.g. include PSTN media channels 49*b*-1, 49*b*-2, 49*b*-3, and 49*b*-4 within their FoS 164) is inactive and available for completion of a call from the PSTN central office switch 41. Extension 82-4 is inactive. As such, the PSTN media channels 47*b*-2, 47*b*-3, and 47*b*-4 are enabled such than an inbound call can be completed.

When the FiC value 147 associated with a media channel 47*b* is updated to zero, hunting will be diverted. When the FiC value 147 associated with a media channel 47*b* is updated from zero to a value greater than zero, hunting will be enabled.

Similar to as discussed above, the flowcharts of FIGS. 9 and 11 represent exemplary operation of the management module 88 for diverting and enabling hunting. More specifically, the flow chart of FIG. 11 represents operation of the management module 88 upon power up or detection of a new PSTN media channel 47*b* to assure that the new media channel 47*b* is set to the proper state of "outgoing calls only—hunting diverted" state or "hunting enabled" state. Step 170 represents detecting the new PSTN media channel 47*b*. Such detection may be recognizing the new channel through traditional ISDN "hand shaking" protocols at power-up of the system 38 or upon connecting a new line 46 to the system 86.

Step 172 represents providing the applicable message(s) to the PSTN central office switch 41 to assure that the new channel 47*b* is set to a known hunting state or, more specifically to the hunting enabled state. An exemplary combination of messages for setting the new channel 47*b* to the hunting state may include first sending a status detection message to the PSTN central office switch 41 and receiving a response at sub step 172*a*. Based on the response, step 172*b* represents determining whether the current state is hunting enabled at step 172*b*. If hunting is not enabled, the management module 88 provides a hunting enable message at sub step 172*b*. Again, the hunting enable message may be the DMOCOC message.

Step 174 represents updating both the Extension resource status table 160 and the PSTN resource status table 142 to reflect the availability of the new channel 47*b*. More specifically this may include adding the new channel 47*b* to the PSTN resource status table 142 and adding the new channel 47*b* to the applicable extension FoS set(s) 164.

Referring to the flowchart of FIG. 9, step 152 represents the management module 88 detecting that the FiC value for any particular PSTN media channel 47*b* changing to zero. This step may be performed by the management module 88:

i) monitoring the PSTN resource status table 116 to detect the FiC 147 changing to zero, ii) detecting a flag indicating that an FiC value 147 changing to zero, or iii) otherwise monitoring the FiC channel state of each PSTN media channel 47b.

Step 154 represents providing a "hunting diversion message" to the PSTN central office switch 41 to divert the PSTN media channel 47b to which its FiC value 147 became zero. The "hunting diversion message" may be any message that is part of the application interface to the PSTN central office switch 41 and which invokes processing within the PSTN system that effectively prevents the PSTN central office switch 41 from hunting the PSTN media channel 47b and instead causes the PSTN central office switch 41 to provide callers on the pilot number with a busy signal. The message may identify the hunting group or may identify the media channels 47b within the hunting group to which the diversion message applies.

Again, the hunting diversion message may be the known "Inform" message that activates a Dedicated to Making Outgoing Calls Only Control (DMOCOC) feature for an inactive PSTN channel 47b.

Step 156 represents the management module 88 detecting that the FiC value for any particular PSTN media channel 47b changing from zero to one. This step may be performed by the management module 88: i) monitoring the PSTN resource status table 116 to detect the FiC 147 changing form zero to one, ii) detecting a flag indicating that an FiC value 147 changing from zero to one, or iii) otherwise monitoring the FiC channel state of each channel 47b.

Step 158 represents providing a "hunting enable message" to the PSTN central office switch 41. The "hunting enable message" may again be any message that is part of the application interface to the PSTN central office switch 41 and which invokes processing within the PSTN system that effectively reverses the effect to the "hunting diversion message" of step 154 for the PSTN media channel 47b. Again, the hunting enable message may be the "Inform" message that activates a Dedicated to Making Outgoing Calls Only Control (DMOCOC) feature for a channel.

It should be appreciated that the above described systems and methods provide for a PBX switch to divert open PSTN channels from a hunting group associated with a pilot number when no extensions are available for completing the call in a manner that provides for the caller to receive a busy signal and in a manner that does not deactivate the hunting process upon receipt of another call on the pilot number.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A communication channel management system for: i) coupling to a PSTN central office switch by a plurality of ISDN communication lines, each comprising a least a first media communication channel, a second media communication channel, and a data channel; ii) coupling to the Internet by a packet switched communication line; and iii) coupling to at least a first telephone extension and a second telephone a private telephone network, the first media communication channel and the second media communication channel being part of a single hunt group, associated with a single pilot number, and managed by a hunting function of the PSTN central office switch the communication channel management system comprising:

a PSTN interface coupling to the plurality of ISDN communication lines and generating PSTN channel signaling and PSTN channel media communications;

a VoIP interface coupled to the packet switched communication line for generating VoiP channel signaling and VoIP media communications;

a private telephone interface coupling to the private telephone network and generating private telephone channel signaling and private telephone channel media communications over the private telephone network to each of the two telephone extensions;

a resource status table comprising a plurality of records, each record identifying one of the telephone extensions, indicating whether the telephone extension is in an active state, and associating the telephone extension to at least one media communication channel for placement of inbound calls to the telephone extension and placement of outbound calls initiated by the telephone extension, a first of the records associating the first extension to each media communication channel of the hunt group and a second of the records associating the second extension to each media communication channel of the hunt group;

a management module adapted to:
    upon initiating an outbound telephone call by one of the telephone extensions: i) record, in the resource status table, an indication that the telephone extension is in an active state; and ii) route the outbound telephone call from the private telephone interface to one of the PSTN interface and the VoIP interface;
    upon receipt of an inbound call detected by the PSTN interface: i) route the inbound telephone call to one of the telephone extensions associated with the media communication channel; and ii) record, in the resource status table, an indication that the telephone extension in an active state; and
    upon termination of a call, record in the resource status table, an indication that the telephone extension is in an inactive state;

the management module being further adapted to control the hunting function of the PSTN central office switch by:
    detecting the state of each telephone extension associated with one of the media communication channels of the hunt group and: i) in response to determining that all of the telephone extensions associated with the hunt group are in the active state, provide a hunting diversion message to the PSTN central office; and ii) in response to determining that at least one telephone extension associated with one of the media communication channels of the hunt group is in an inactive state, provide a hunting enable message to the PSTN central office.

2. The communication channel management system of claim 1, wherein the hunting diversion message and the hunting enable message are of a same message format that toggles a state of the channel between a state wherein it is included within the hunting group and a state wherein it is excluded from the hunting group.

3. The communication channel management system claim 2, wherein both the hunting diversion message and the hunting enable message are a Dedicated for Making Outgoing Call only Control message identifying the channel.

4. The communication channel management system claim 3, wherein the management module provides for detecting that the state of each telephone extension associated with one of the media communication channels of the hunt group, are in the active state by detecting that a fan in count for a PSTN communication line is equal to zero.

5. The communication channel management system claim 4, wherein the management module provides for detecting that at least telephone extension associated with one of the media communication channels of the hunt group is in the inactive state and is available for an inbound call by detecting that a fan in count for a PSTN communication line is at least one.

* * * * *